(12) United States Patent
Bensen et al.

(10) Patent No.: US 9,532,588 B2
(45) Date of Patent: Jan. 3, 2017

(54) MOLDED FOOD PRODUCT (71) Applicant: The J.M. Smucker Company, Orrville, OH (US)

(72) Inventors: Kyle Bensen, Navarre, OH (US); James Andrew Jindra, Wooster, OH (US)

(73) Assignee: The J.M. Smucker Company, Orrville, OH (US)

(*) Notice: Subject to any disclaimer, the term of this patent is extended or adjusted under 35 U.S.C. 154(b) by 0 days.

(21) Appl. No.: 14/700,432

(22) Filed: Apr. 30, 2015

(65) Prior Publication Data

US 2016/0316795 A1 Nov. 3, 2016

(51) Int. Cl.
*A23L 1/38* (2006.01)

(52) U.S. Cl.
CPC .............. *A23L 1/38* (2013.01); *A23V 2002/00* (2013.01)

(58) Field of Classification Search
CPC .......... A23G 3/34; A23G 3/42; A23G 3/0019; A23G 3/30053; A23G 3/0061; A23G 2200/08; A23L 1/38; A23D 2/181; A23P 1/105; C11C 3/00
USPC ....... 426/633, 634, 658, 512, 514, 515, 606, 426/607, 593
See application file for complete search history.

(56) References Cited

U.S. PATENT DOCUMENTS

| | | | |
|---|---|---|---|
| 2,255,032 A | 9/1941 | Weisgurt et al. | |
| 4,839,184 A | 6/1989 | Cherukuri et al. | |
| 5,160,759 A | 11/1992 | Nomura et al. | |
| 6,461,654 B1 | 10/2002 | Cain et al. | |
| 6,582,748 B1 | 6/2003 | Loh et al. | |
| 7,157,110 B2 | 1/2007 | Loh et al. | |
| 7,691,428 B2 | 4/2010 | Skogerson et al. | |
| 8,080,275 B2* | 12/2011 | Ringhouse | A23L 1/38 426/601 |
| 8,227,011 B2* | 7/2012 | Loh | A23D 7/0056 424/750 |
| 2004/0052921 A1 | 3/2004 | Loh et al. | |
| 2005/0214436 A1 | 9/2005 | Doucet | |
| 2006/0105092 A1 | 5/2006 | Miller | |
| 2007/0190186 A1 | 8/2007 | Loh et al. | |
| 2009/0017181 A1 | 1/2009 | Doucet | |
| 2009/0220653 A1 | 9/2009 | Doucet | |
| 2011/0281014 A1 | 11/2011 | Higgins | |
| 2011/0281015 A1 | 11/2011 | Higgins et al. | |
| 2012/0121786 A1 | 5/2012 | Higgins et al. | |
| 2014/0377387 A1* | 12/2014 | Newman | A61K 35/60 424/745 |

OTHER PUBLICATIONS

Pillsbury Cookies, Peanut Butter with Reese's Mini pieces, htt://www.fooducate.com/app, 2010-2016, pp. 1 and 2.*
Wit & Whistle, Peanut butter Balls, http://witandwhistle.com/2010/12/16/peanut-butter-balls/, Dec. 16, 2010, pp. 1-3.*
A. Blake & A. Marangoni, A Comparative Study of Waxes as Oil-Binding Materials, 2012 AOCS Meeting, http://www.aocs.org/Meetings/content.cfm?ItemNumber=18752, University of Guelph, Guelph, Ontario, Canada.

\* cited by examiner

*Primary Examiner* — Helen F Heggestad
(74) *Attorney, Agent, or Firm* — Michael A. Olshavsky (57) ABSTRACT

A molded food product is disclosed. The molded food product includes at least one type of a legume butter or nut butter or seed butter, at least one thickening agent, and a plant-derived wax.

7 Claims, 5 Drawing Sheets

MOLDED FOOD PRODUCT

TECHNICAL FIELD

The invention generally relates to molded food products and methods of manufacture. More particularly, the invention relates to legume butter or nut butter or seed butter containing food compositions that are moldable.

BACKGROUND OF THE INVENTION

Peanut butter and various tree nut butters are enjoyed by consumers and have a variety of uses. One of the most common ways such butters are consumed is by simply scooping and eating the product directly out of the container with a spoon. Many people enjoy combining peanut butter with jams, jellies, or preserves in the preparation of sandwiches. Peanut butter is also used as a spread and eaten with crackers, fruits (e.g. bananas), and vegetables (e.g. celery). Peanut butter is also used in a multitude of baking and cooking applications. The characteristics which contribute to the wide variety of uses for peanut butter include its flavor, its high protein content and other nutritional properties, as well as its suitability for consumption either alone or in combination with a variety of other foods.

Consumers also enjoy eating snack bars. These snack bars are typically composed of ingredients such as cereal, granola, grains, and nuts. The snack bars can also include other ingredients such as confectionary products, fruits, and peanut butter. Consumers enjoy eating snack bars because they are portable and provide a convenient way to snack.

Accordingly, it would be desirable to provide peanut butter and various other butters made from ground legumes or ground nuts or ground seeds in the form of a molded food product, such as a snack bar.

SUMMARY OF THE INVENTION

In general, one aspect of the invention is to provide a molded food product. The molded food product comprises at least one type of butter comprising ground legumes or ground nuts or ground seeds, at least one thickening agent comprising a monosaccharide, a disaccharide, a sugar alcohol, an oligosaccharide, or mixtures thereof, and a plant-derived wax.

In still yet another aspect of the invention, a food product is provided. The food product comprises about 85-94 wt. % of at least one type of butter comprising ground legumes or ground nuts or ground seeds, about 5.0-10.0 wt. % of at least one thickening agent comprising a monosaccharide, a disaccharide, a sugar alcohol, an oligosaccharide, or mixtures thereof, and about 1.0-5.0 wt. % of a plant-derived wax.

In yet another aspect of the invention a method of preparing a molded food product is provided. The method comprising the steps combining at least one type of butter comprising ground legumes or ground nuts or ground seeds with powdered sugar, agitating and heating the combination to a temperature below about 195° F. to create a hot mixture, mixing a melted plant-derived wax with the hot mixture to form a pliable composition, and molding the pliable composition into a shape that upon cooling becomes the molded food product.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE INVENTION

Unless otherwise defined, all technical and scientific terms used herein have the same meaning as is commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as weight percent, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported with relative precision. Any numerical values, however, may inherently contain certain errors necessarily resulting from error found in their respective measurements. As used herein, all percentages (%) are by weight, unless otherwise indicated.

As used herein, the term "butter" means a spreadable food product comprising a mixture of ground legumes, ground nuts, ground seeds, or mixtures thereof and fat/oil, plus other optional ingredients such as, but not limited to, thickening agents, flavorants, flavor enhancers, wax, and mixtures thereof. Additionally, embodiments of the invention will fall under the categorization of either "peanut butter" or "peanut spread" as defined by the standards of identity of the U.S. Food and Drug Administration under 21 C.F.R 164.150 and 21 C.F.R 102.23.

In one embodiment of the invention, a molded food product is disclosed and includes at least one type of butter comprising ground legumes, ground nuts, or ground seeds, at least one thickening agent, and a plant-derived wax.

While the embodiments of the invention will be generally described in terms of peanuts and peanut butter, it should be readily apparent that other legume butters or nut butters or seed butters are considered within the scope of the embodiments of the invention. In general, the at least one type of ground legumes, ground nuts or ground seeds are selected from the group consisting of peanuts, almonds, pecans, walnuts, cashews, macadamia nuts, hazelnuts, Brazilian nuts, sunflower seeds, sesame seeds, pumpkin seeds, and mixtures thereof. In one embodiment, the molded food product comprises about 85-94 wt. % of at least one type of a butter comprising ground legumes, ground nuts or ground seeds. The ground legumes, ground nuts or ground seeds are used in a butter selected from the group consisting of peanut butter, almond butter, pecan butter, walnut butter, cashew butter, macadamia nut butter, hazelnut butter, Brazilian nut butter, sunflower seed butter, sesame seed butter, pumpkin seed butter, and mixtures thereof.

In another embodiment of the invention, the butter comprises an unstabilized mixture of fine ground peanuts that includes roasted and ground peanuts and has a fineness of grind in the range from about 4.0 mils-5.5 mils (1 mil=25.4 µm). In an alternate embodiment, the butter comprises an unstabilized mixture of coarse ground peanuts that includes roasted and ground peanuts and less than 1.0% by weight salt and has a fineness of grind in the range from about 13.0 mils-17.0 mils.

In still yet another embodiment of the invention, the thickening agent includes, but is not limited to, a monosaccharide, a disaccharide, a sugar alcohol, an oligosaccharide, or mixtures thereof. The monosaccharide is selected from the group consisting of glucose, fructose, galactose, and mixtures thereof. The disaccharide is selected from the group consisting of granulated sugar, powdered sugar, lactose, maltose, brown sugar, molasses, and mixtures thereof. The sugar alcohol is selected from the group consisting of sorbitol, erythritol, maltitol, xylitol, mannitol, lactitol, and mixtures thereof. The oligosaccharide is selected from the group consisting of raffinose, maltotriose, fructo-oligosaccharide, and polydextrose, and mixtures thereof. In one embodiment, the molded food product comprises about 5.0-10.0 wt. % of at least one thickening agent.

In yet another embodiment of the invention, the thickening agent is powdered sugar having a particle size in the range from about 1 µm-200 µm. In other embodiments, the thickening agent is granulated sugar having a particle size in the range from about 150 µm-1000 µm.

A further embodiment of the invention is the inclusion of a plant-derived wax selected from the group consisting of rice bran wax, sugarcane wax, sunflower wax, and candelilla wax. In one embodiment, the molded food product comprises about 1.0-5.0 wt. % of a plant-derived wax.

Figure 1:
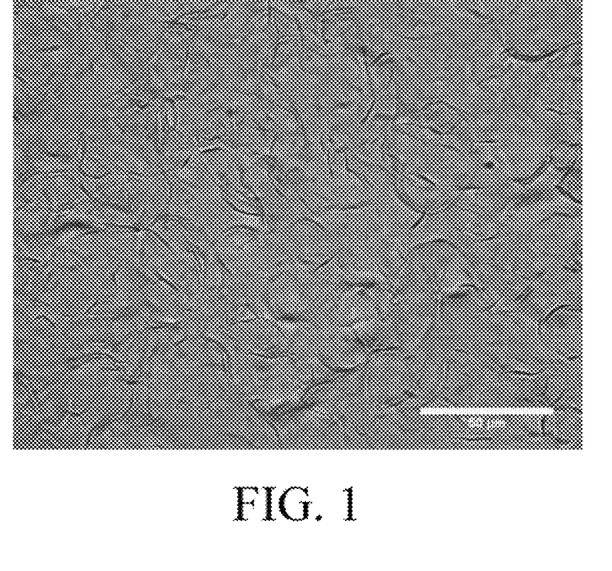
FIG. 1 is an optical light microphotograph of a wax crystal network of rice bran wax.
Figure 2:
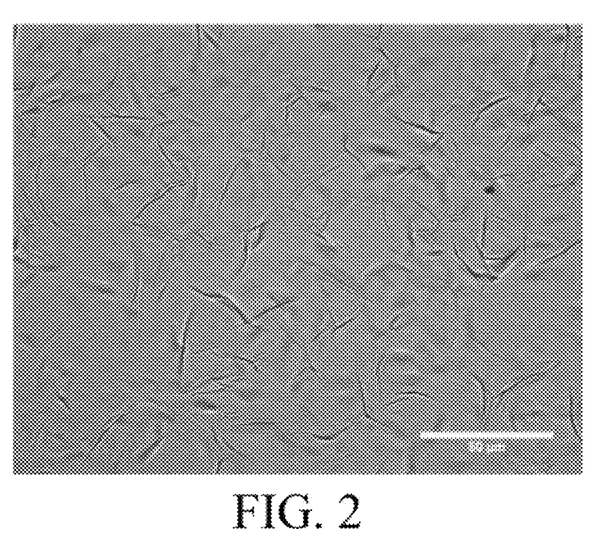
FIG. 2 is an optical light microphotograph of a wax crystal network of sunflower wax.
Figure 3:
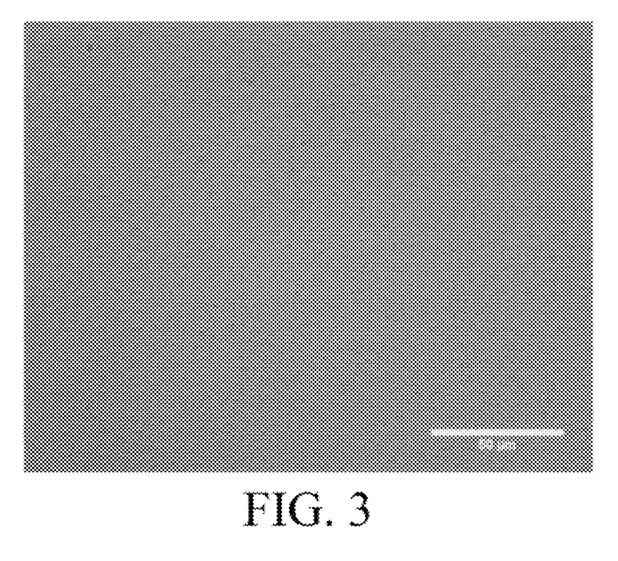
FIG. 3 is an optical light microphotograph of a wax crystal network of candelilla wax.

Without intending to be bound by theory, it is believed that the plant-derived wax creates a wax crystal network within the molded food product and that this crystal network interacts with the oil present in the legume butters, nut butters, and seed butters. It is also possible that due to effects of surface tension, this interaction occurs to a large extent within the pores and capillaries of the wax crystal network and, as a result of van der Waals forces, the oil adsorbs and adheres to the surface of the wax crystal network. Representative wax crystal networks for rice bran wax, sugarcane wax, and candelilla wax are shown in the optical light microphotographs in FIGS. 1-3.

Figure 4A:
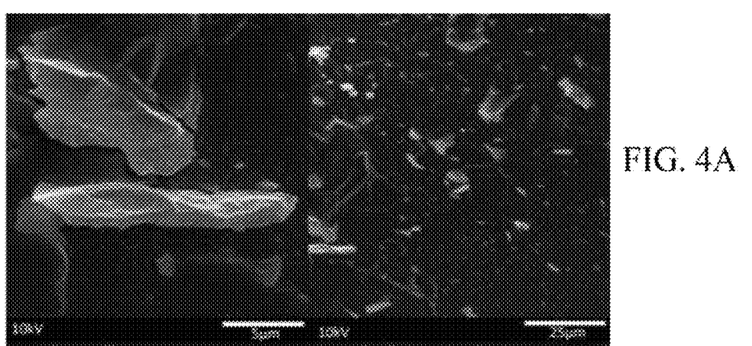
FIG. 4A is an image from a scanning electron microscope of the platelet structure of rice bran wax.
Figure 4B:
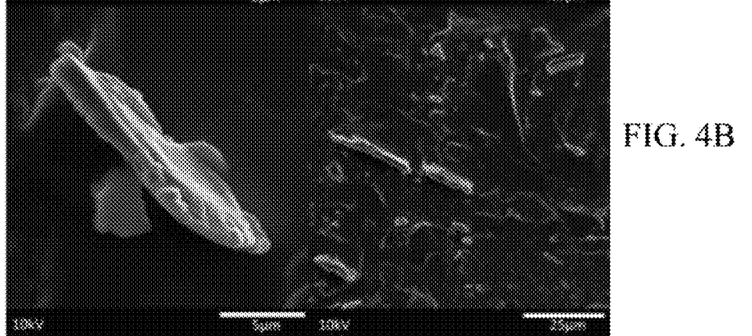
FIG. 4B is an image from a scanning electron microscope of the platelet structure of sunflower wax.
Figure 4C:
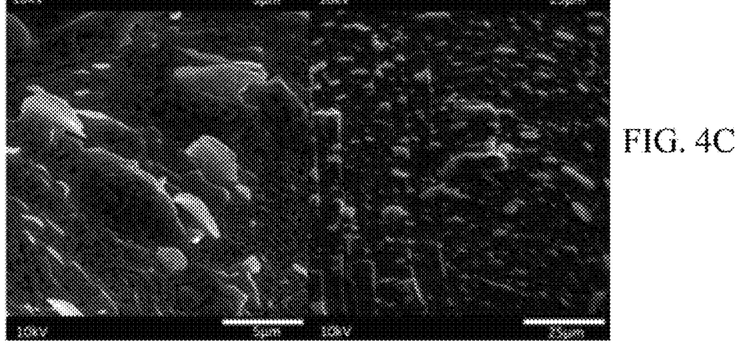
FIG. 4C is an image from a scanning electron microscope of the platelet structure of candelilla wax.

It has surprisingly been found, using scanning electron microscopy (Food Structure, Vol. 3, January 2015, pgs. 30-34), that the wax crystals from rice bran wax, sunflower wax, and candelilla wax actually have the platelet-like morphology as seen in FIGS. 4A-4C.

The needle-like appearance of the waxes seen in optical light microscopy may simply be an artifact of how the samples crystalize on a glass substrate during sample preparation for optical light microscopy imaging. Considering that waxes are hydrophobic, due in part to their high ester content, and that glass surfaces are typically hydrophilic, crystallization of a hydrophobic wax on a hydrophilic glass surface would involve a thermodynamically unfavorable interaction and an increase in entropy which would drive the Gibb's free energy ($\Delta G$) to above zero. However, if the wax were to crystallize on a platelet edge the interfacial surface area of contact between the hydrophobic wax and hydrophilic glass would be minimized, which would reduce the thermodynamic penalty and the positive $\Delta G$ associated with such an interaction. If such on-edge platelet crystallization occurred in a sample and the sample was subsequently examined under microscope, the protruding edges associated the platelets would be in view and this would give the sample a needle-like appearance.

Platelet length appears comparable to "needle" length measurements obtained from optical light micrographs. As further seen in FIGS. 4A-4C, candelilla wax crystals are smaller and more highly homogenously dispersed compared to rice bran wax and sunflower wax crystals. At lower magnifications, a higher number of candelilla wax crystals are observed in the field of view compared to rice bran wax and sunflower wax, which provides evidence for the high dispersion of candelilla wax crystals. The larger and less homogenously dispersed crystals associated with rice bran wax and sunflower wax may indicate that the oil pores for crystals comprising these particular waxes are larger compared to those present in crystals comprising candelilla wax.

In addition to crystal shape and dispersion, other morphological factors associated with a wax's crystal structure which may also impact its ability to structure oil. For example, the surface area and platelet size associated with the wax crystals are contemplated as important and worth further consideration. Again, without intending to be bound by theory, it is believed that surface area, surface roughness and surface quality may influence the amount of oil that can be bound within the wax crystal network.

The molded food product can also contain an edible inclusion or morsel in the shape of, for example, chips or chunks. The chips or chunks include confectionary chips, confectionary chunks, flavor chips, flavor chunks, and the like. The chip or chunk include white, dark, or milk chocolate chips or chunks, butterscotch chips or chunks, vanilla chips or chunks, butter chips or chunks, peanut butter chips or chunks, coconut chips or chunks, caramel chips or chunks, fruit flavored chips or chunks, raisins, dried or dehydrated cranberries, raspberries, blueberries, strawberries, or other dried berries, fruit pieces, such as dried or dehydrated fruit pieces including apricot, apple, plum, peach, orange, banana, pineapple, mango, and cherry pieces, nuts, or pieces of nuts, such as macadamia nuts, peanuts, walnuts, almonds, hazelnuts, pecans, brazil nuts, pistachios, seeds such as pumpkin seeds, roasted or non-roasted coffee beans, candy or candy bar pieces, ready-to-eat cereal clusters, granola, and mixtures thereof.

The molded food product can be formed in any suitable shape, size and thickness. It can have a regular or irregular geometric shape. Regular geometric shapes include, for example, rectangular, square, circular, or oval cross-sections. Although not limited thereto, the molded food product may be cut into sizes having a weight from about 25 g to about 100 g.

The molded food product can be packaged in any suitable manner. In one embodiment, the bars are individually wrapped such as in conventional flexible metallized film known in the art and used for this general purpose. The individually wrapped bars can be packaged in a container, or a plurality of wrapped bars can be packaged in a suitable container or carton.

Figure 5:
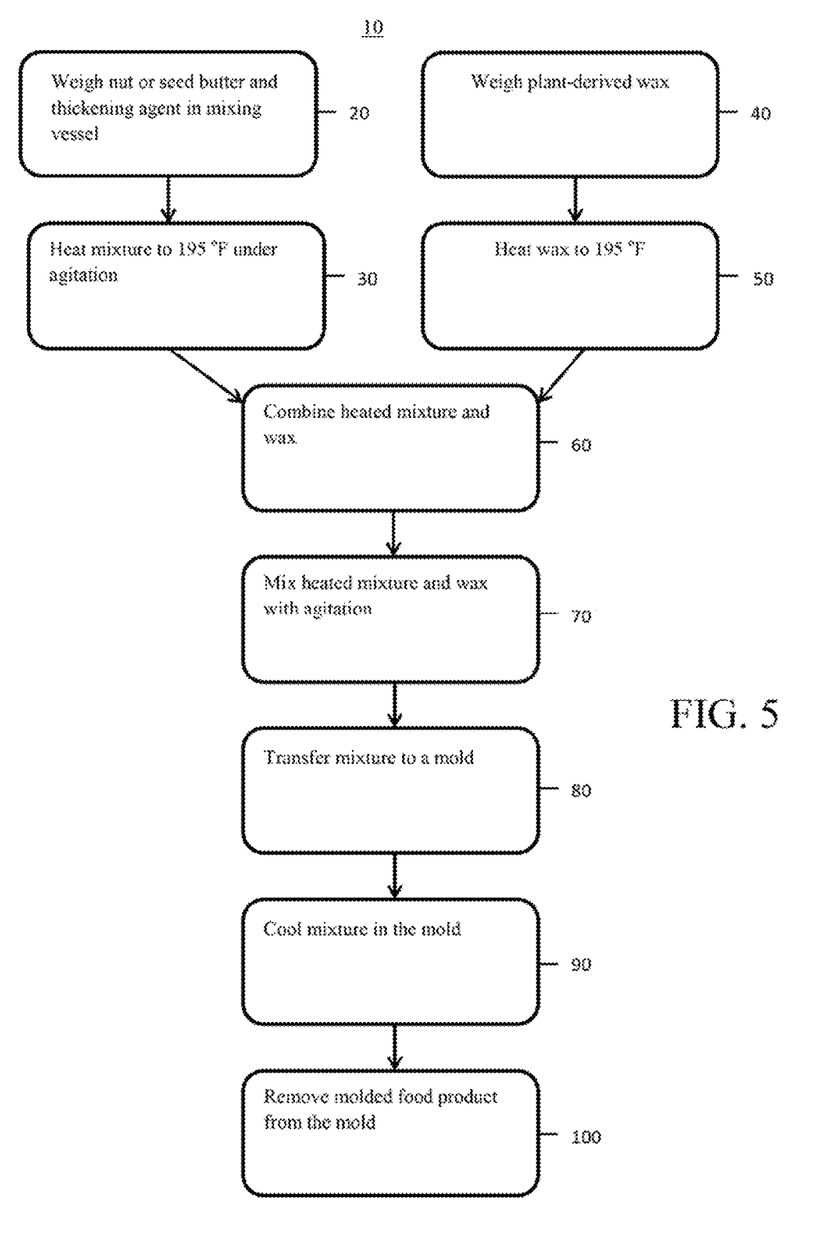
FIG. 5 is a flowchart of an embodiment of a method of preparing a food product according to an embodiment of the invention.

An exemplary embodiment of the invention is shown in FIG. 5, wherein a flowchart for a method for preparing a molded food product is depicted. The method 10 for preparing the molded food product begins with step 20 in which the nut butter or seed butter and the thickening agent are weighed and placed in a mixing vessel. In step 30, the nut butter or seed butter and the thickening agent are heated to a temperature of about 195° F. under agitation. In steps 40 and 50, the plant-derived wax is weighed and then heated to a temperature of about 195° F. In this particular embodiment, the plant-derived wax may be heated in a hot water bath. Once the plant-derived wax melts, it is added to the mixture containing the nut butter (or seed butter) and the thickening agent. This mixture is then agitated in step 70 for approximately thirty minutes. In order to allow for proper mixing, the temperature of the mixture should be maintained at no less than about 175° F. so that the wax does not harden prematurely. After the mixing is complete in step 70, the mixture is transferred to a mold in step 80. During step 90, the mixture is allowed to cool in the mold, and then removed from the mold in step 100. After this point, the molded food product is ready for packaging.

In an alternate embodiment, a method for preparing a molded food product includes combining at least one type of butter comprising ground legumes or ground nuts or ground seeds with powdered sugar. The combination of ground legumes or ground nuts or ground seeds with powdered sugar is then agitated and heated to a temperature below about 195° F. to create a hot mixture. A melted plant-derived wax is then mixed with the hot mixture to form a pliable composition. The pliable composition is molded into a desired shape that upon cooling becomes the molded food product.

EXAMPLES

The following examples are intended to illustrate embodiments of the invention, but are not meant to be limiting thereof.

Example 1

| Material | Weight % |
| --- | --- |
| Peanut Butter (Fine) | 89.0 |
| Thickening Agent (Granulated Sugar) | 10.0 |
| Rice Bran Wax | 1.0 |

Example 2

| Material | Weight % |
| --- | --- |
| Peanut Butter (Fine) | 87.0 |
| Thickening Agent (Granulated Sugar) | 10.0 |
| Rice Bran Wax | 3.0 |

Example 3

| Material | Weight % |
| --- | --- |
| Peanut Butter (Fine) | 85.0 |
| Thickening Agent (Granulated Sugar) | 10.0 |
| Rice Bran Wax | 5.0 |

Example 4

| Material | Weight % |
| --- | --- |
| Peanut Butter (Fine) | 89.0 |
| Thickening Agent (Powdered Sugar) | 10.0 |
| Rice Bran Wax | 1.0 |

Example 5

| Material | Weight % |
| --- | --- |
| Peanut Butter (Fine) | 87.0 |
| Thickening Agent (Powdered Sugar) | 10.0 |
| Rice Bran Wax | 3.0 |

Example 6

| Material | Weight % |
| --- | --- |
| Peanut Butter (Fine) | 85.0 |
| Thickening Agent (Powdered Sugar) | 10.0 |
| Rice Bran Wax | 5.0 |

Example 7

| Material | Weight % |
| --- | --- |
| Peanut Butter (Coarse) | 89.0 |
| Thickening Agent (Granulated Sugar) | 10.0 |
| Rice Bran Wax | 1.0 |

Example 8

| Material | Weight % |
|---|---|
| Peanut Butter (Coarse) | 87.0 |
| Thickening Agent (Granulated Sugar) | 10.0 |
| Rice Bran Wax | 3.0 |

Example 9

| Material | Weight % |
|---|---|
| Peanut Butter (Coarse) | 85.0 |
| Thickening Agent (Granulated Sugar) | 10.0 |
| Rice Bran Wax | 5.0 |

Example 10

| Material | Weight % |
|---|---|
| Peanut Butter (Coarse) | 89.0 |
| Thickening Agent (Powdered Sugar) | 10.0 |
| Rice Bran Wax | 1.0 |

Example 11

| Material | Weight % |
|---|---|
| Peanut Butter (Coarse) | 87.0 |
| Thickening Agent (Powdered Sugar) | 10.0 |
| Rice Bran Wax | 3.0 |

Example 12

| Material | Weight % |
|---|---|
| Peanut Butter (Coarse) | 85.0 |
| Thickening Agent (Powdered Sugar) | 10.0 |
| Rice Bran Wax | 5.0 |

Samples of molded food products were prepared according to the process described above using the formulations provided in Examples 1-12. Each sample was tested in order to determine the percent oil loss for each sample. In order to measure the amount of oil released from each sample, two empty Whatman #1 filter papers were weighed-out and a 5 gram portion of each sample was placed between the two filter papers. A two kilogram weight was centrally placed on top of each sandwiched sample for about 5 seconds in order to compress the sample in a consistent, reproducible manner. Each sample was allowed to remain in this arrangement for 24 hours at a temperature between about 68° F. and 72° F. The amount of oil released from the sample into the filter papers was then determined by gravimetric measurement. To correct for any effects due to ambient humidity, a control set of empty filter papers, exposed to the same environment as the test sample (a temperature between about 68° F. and 72° F. for 24 hours), were also measured and this was used to adjust for any gravimetric change due to moisture pick up. The result of these measurements is provided in FIG. 6.

Figure 6:
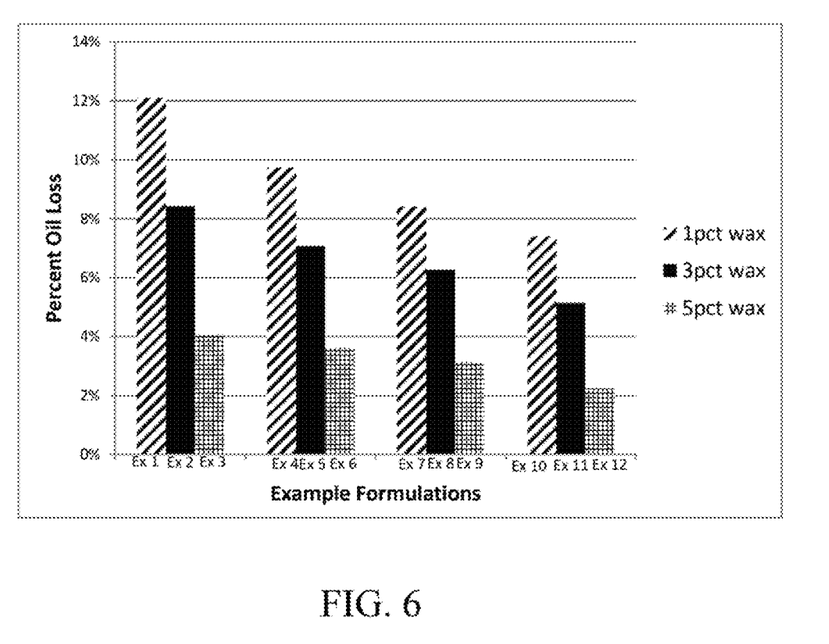
FIG. 6 is a graph showing the amount of oil loss in samples prepared according to an embodiment of the invention.

Analysis of the data shown in FIG. 6 leads to several surprising results. First, an unexpected reduction in oil loss is obtained when a fine particle size thickening agent is used (see Examples 4-6 and 10-12) in comparison to when a coarse particle size thickening agent is used (see Examples 1-3 and 7-9), and this is observed for both the fine and coarse ground peanut butters at all levels of wax. Second, an unexpected reduction in oil loss is also obtained when a fine particle size thickening agent is used in comparison to when a coarse particle size thickening agent is used with similar grind size peanut butters at different levels of wax (see Example 4 vs. Example 1, Example 5 vs. Example 2, and Example 6 vs. Example 3, Example 10 vs. Example 7, Example 11 vs. Example 8, and Example 12 vs. Example 9). Finally, the data also surprisingly reveals that coarse ground peanut butter, used in combination with different levels of wax and a fine particle size thickening agent (see Examples 10-12), results in a lower oil loss as compared to fine ground peanut butter used in combination with different levels of wax and a coarse particle size thickening agent (see Examples 4-6). The general conclusion this leads to is that using larger nut particles (from coarse ground peanut butter), in combination with a thickening agent having a decreased particle size, results in an unexpected reduction in oil loss from the associated samples.

Yet again, without wishing to be bound by theory, it is believed that the observed reduction in oil loss may be the result of a mechanism that involves the wax crystal network interacting with particulate materials, such as the larger nut particles in the coarse peanut butter and the fine particle size thickening agent, and forming a packing arrangement in the molded samples. It is also believed that a reduction in oil loss in the molded food product may be due to creaming of the oil in the ground peanuts with the fine particle size thickening agent. When creaming occurs, small air cells are formed and then incorporated into the mixture. This part of the mixture can become softer in consistency and the associated volume can become large, depending upon the amount of oil in the mixture. Creaming is typically controlled by several factors including the temperature of the fat or oil and speed of mixing. For example, fat or oil which is too cold (e.g. less than about 70° F.) will typically not be plastic enough to incorporate quickly and hold air cells effectively. Conversely, fat or oil which is too warm (e.g. greater than 75° F.) may not be able to hold sufficient air or provide adequate volume because the mixture is too soft and unable to tolerate the friction associated with a process involving constant mixing.

Based upon the foregoing disclosure, it should now be apparent that the molded food products as described herein will carry out the objects set forth hereinabove. It is, therefore, to be understood that any variations evident fall within the scope of the claimed invention and thus, the selection of specific component elements can be determined without departing from the spirit of the invention herein disclosed and described.

What is claimed is:

1. A molded food product comprising a mixture of:
   at least one type of butter comprising coarsely ground legumes or coarsely ground nuts or coarsely ground seeds, wherein the at least one type of butter has a fineness of grind in the range from about 13.0 mils-17.0 mils; and at least one thickening agent comprising powdered sugar, wherein the powdered sugar has a particle size in the range from about 1 µm-200 µm, and a plant wax.

2. A molded food product comprising a mixture of:

at least one type of butter comprising coarsely ground legumes or coarsely ground nuts or coarsely ground seeds, wherein the at least one type of butter has a fineness of grind in the range from about 13.0 mils-17.0 mils;

at least one thickening agent comprising granulated sugar, wherein the granulated sugar has a particle size in the range from about 150 µm-1000 µm, and a plant wax.

3. A molded food product comprising a mixture of:

about 85-94 wt. % of at least one type of butter comprising coarsely ground legumes or coarsely ground nuts or coarsely ground seeds, wherein the at least one type of butter has a fineness of grind in the range from about 13.0 mils-17.0 mils;

about 5.0-10.0 wt. % of at least one thickening agent comprising powdered sugar, wherein the powdered sugar has a particle size in the range from about 1-200 µm, and about 1.0-5.0 wt. % of a plant wax.

4. A molded food product comprising a mixture of:

about 85-94 wt. % of a butter comprising roast and coarsely ground peanuts that has a fineness of grind in the range from about 13.0 mils-17.0 mils;

about 5.0-10.0 wt. % of a thickening agent comprising powdered sugar with a particle size in the range from about 1 µm-200 µm; and about 1.0-5.0 wt. % of plant wax.

5. The molded food product of claim 4, wherein the plant wax comprises rice bran wax.

6. The molded food product of claim 4 further comprising a topical coating of confectionary chips, confectionary chunks, yogurt chips, dried fruit, nut pieces, and mixtures thereof.

7. A method of preparing the molded food product of claim 4, comprising the steps of:

combining the butter comprising roast and coarsely ground peanuts with the powdered sugar;

agitating and heating the combination to a temperature below about 195° F. to create a hot mixture;

melting the plant wax;

mixing the melted plant wax with the hot mixture to form a pliable composition; and molding the pliable composition into a shape that upon cooling becomes the molded food product.

* * * * *